United States Patent [19]

Dietz

[11] 4,352,681
[45] Oct. 5, 1982

[54] ELECTROSTATICALLY AUGMENTED CYCLONE APPARATUS

[75] Inventor: Peter W. Dietz, Delanson, N.Y.

[73] Assignee: General Electric Company, Schenectady, N.Y.

[21] Appl. No.: 288,706

[22] Filed: Jul. 30, 1981

Related U.S. Application Data

[62] Division of Ser. No. 195,174, Oct. 8, 1980, abandoned.

[51] Int. Cl.³ .............................................. B03C 3/14
[52] U.S. Cl. ...................................... 55/127; 55/152
[58] Field of Search ........................... 55/127, 150–153

[56] References Cited

U.S. PATENT DOCUMENTS 4,212,653  7/1980  Giles ..................................... 55/261

FOREIGN PATENT DOCUMENTS 714367   7/1965  Canada ................................. 55/127
878636   6/1953  Fed. Rep. of Germany ........ 55/127
948240   8/1956  Fed. Rep. of Germany ........ 55/127
569973  11/1957  Italy ..................................... 55/127

Primary Examiner—Bernard Nozick
Attorney, Agent, or Firm—Paul J. Checkovich; James C. Davis, Jr.; Marvin Snyder

[57] ABSTRACT

Separation of particulates from a gaseous stream in a reverse flow cyclone separator is enhanced through the incorporation of a corona producing electrode in the cyclonic separation zone whereby particulates are first charged by the corona current and are subsequently displaced from the gaseous stream by the electrostatic forces generated by the electrode.

4 Claims, 5 Drawing Figures

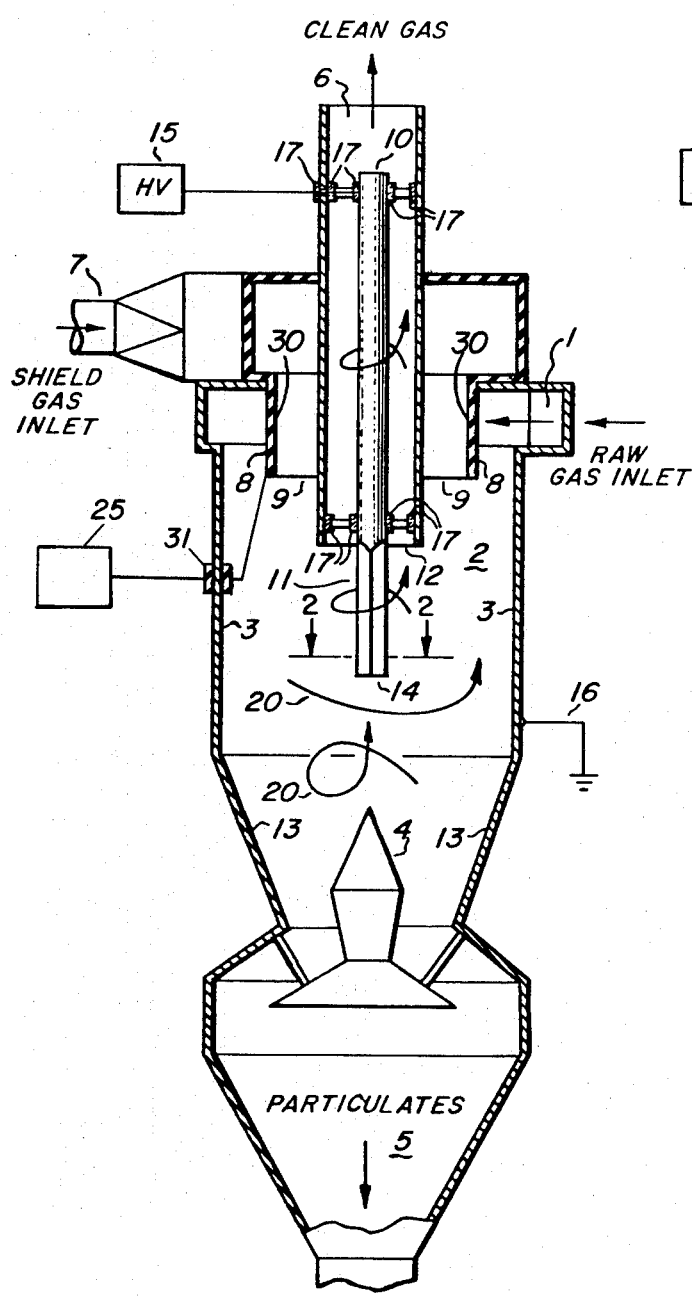
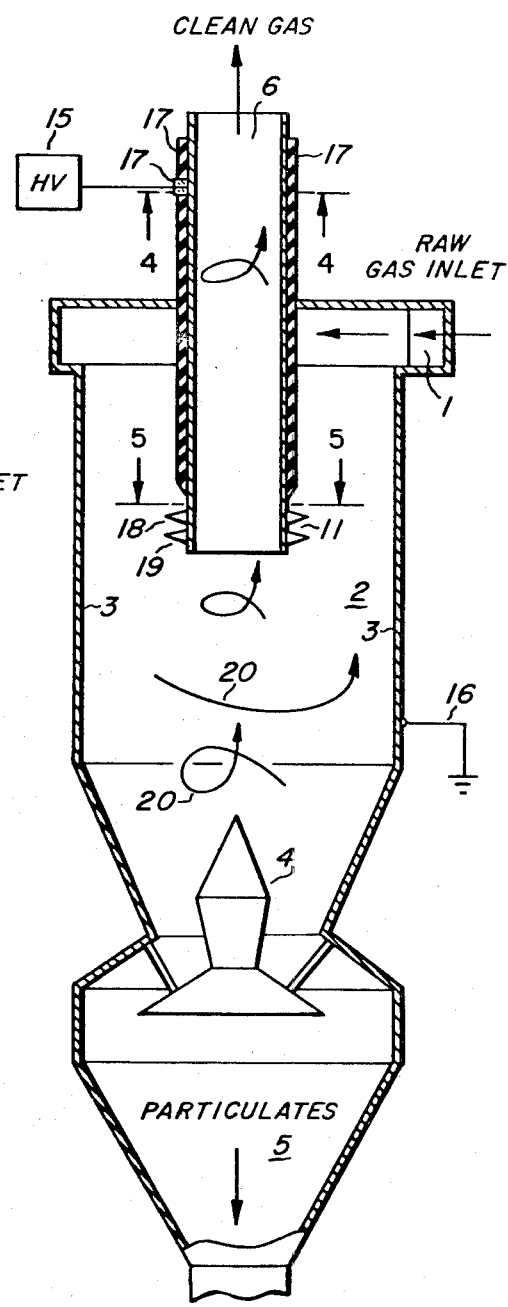
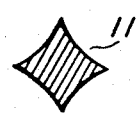
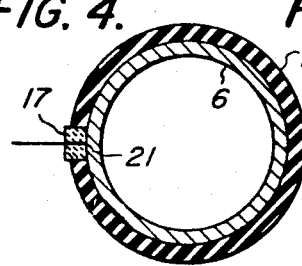
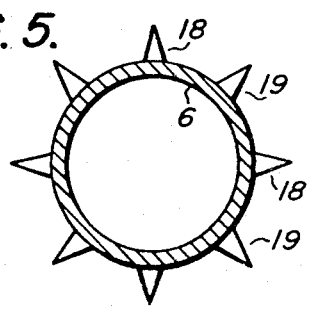

ELECTROSTATICALLY AUGMENTED CYCLONE APPARATUS

This application is a division of application Ser. No. 195,174, filed Oct. 8, 1980 now abandoned.

BACKGROUND OF THE INVENTION

The present invention relates to an improved reverse flow cyclone separator and process for separating particulate matter from an influent raw gas stream.

Cyclone separators are well-known devices for removing particulates from a gas stream. In principle, a stream of particle-laden raw gas is introduced tangentially into a cyclonic separation zone so that the particles experience a centrifugal force in the ensuing swirling flow. The particles are collected on the outer wall of the separation zone and a resultant clean gas exits from a central exhaust duct.

It has been demonstrated that the performance of conventional reverse flow cyclones is typically reduced by a short circuiting of particulate laden raw gas from the cyclone inlet into the exhaust duct, thus bypassing the main body of the cyclone separator. An improved reverse flow cyclone separator described in U.S. Pat. No. 4,212,653 (Giles) avoids this source of performance degradation by employing a clean air shield between an influent raw gas flow and an outlet duct. Nevertheless, this improved cyclone separator still exhibits the centrifugal separation characteristic of decreased particle separation efficiency with decreasing particle mass. Accordingly, it is an object of the present invention to enhance the performance of reverse flow cyclone separators. More particularly, it is an object of the present invention to augment the centrifugal separation process characteristic of reverse flow cyclone separators through the employment of electrostatic forces. Correspondingly, it is a further object of the present invention to improve the separation efficiency of reverse flow cyclone separators, including an improved capacity to separate relatively small particulates from an influent raw gas stream.

SUMMARY OF THE INVENTION

Generally stated, the present invention provides an improvement for increasing the separation efficiency of reverse flow cyclone separation processes and apparatus. Such a separator includes a cyclonic separation zone disposed in flow communication between a swirl-inducing raw gas inlet and a radially inwardly disposed exhaust duct. According to the present invention a means is provided for producing a corona discharge in the cyclonic separation zone adjacent to and external of the inlet of the exhaust duct. In a preferred embodiment this means includes a rod positioned coaxially in the exhaust duct and having a corona producing portion extending into the cyclonic separation zone. An electrical means is provided for applying a suitable voltage differential between the corona producing rod portion and the outer wall of the cyclonic separation zone so as to enable the formation of both a corona current and an electrostatic force field therebetween. In the practice of the associated separation process, particulate matter contained in the raw gas is charged by contact with the cornoa current and the resultant charged particles are displaced from the raw gas towards the separation zone outer wall by the electrostatic forces. In this manner, the separation efficiency of an associated reverse flow cyclone separator is enhanced, and is particularly enhanced with respect to relatively small particulates typically unseparated by the centrifugal forces of a conventional reverse flow cyclone separator.

BRIEF DESCRIPTION OF THE DRAWING

Advantages and benefits of the present invention may be better understood by referring to the drawing in which:

FIG. 1 is a longitudinal sectional view illustrating an air shield reverse flow cyclone separator according to an embodiment of the present invention;

FIG. 2 is a transverse sectional view illustrating a corona producing electrode portion of the cyclone separator depicted in FIG. 1 as seen from line 2—2 and looking in the direction of the arrows;

FIG. 3 is a longitudinal sectional view illustrating an alternative embodiment of the present invention;

FIG. 4 is a transverse sectional view of an exhaust duct depicted in FIG. 3 taken along the line 4—4 and looking in the direction of the arrows; and FIG. 5 is a transverse sectional view of a corona producing portion of the outlet duct depicted in FIG. 3 as seen along line 5—5 looking in the direction of the arrows.

DESCRIPTION OF THE INVENTION

As depicted in FIGS. 1 and 2, a conventional reverse flow cyclone separator includes a raw gas inlet 1 through which a particulate laden gas is imparted with a swirling motion as it is introduced into a cyclonic separation zone 2. The swirl imparted to the gas tends to centrifugally concentrate particulate matter near the outer wall 3 of the separation zone 2. A base plug 4 also termed a vortex shield is beneficially provided in the lower portion of the separation zone 2 above a suitable collection hopper 5 for separation particulate matter. An exhaust duct 6 is positioned substantially coaxially in the separation zone 2 opposite the base plug 4. The above-noted components of a reverse flow cyclone separator are known in the art as evidenced for example by U.S. Pat. No. 4,212,653 (Giles) assigned to the assignee hereof and incorporated herein by reference.

In the separator depicted in FIG. 1, a second swirl inducing inlet 7 including an inlet structure 8 defines a zone 9 for the introduction of a clean shield gas into the separation zone 2 as more fully described in the Giles patent cited above. In this manner, the short circuiting of particulate laden raw gas from the inlet 1 to the exhaust duct 6 is substantially avoided.

In the present invention a reverse flow cyclone is provided with a means for producing a corona discharge in the separation zone 2. In the embodiment illustrated in FIG. 1 the corona discharge producing means includes a rod-shaped electrode 10 positioned coaxially in the exhaust duct 6. The electrode 10 includes a corona producing portion 11 extending out from the inlet 12 of the exhaust duct 6 and into the cyclonic separation zone 2. The length of corona producing portion extending into the separation zone 2 is variable. However, if it is extended adjacent the vortex shield 4 or frustoconical wall portion 13, the tip 14 of corona producing electrode portion should be blunted to advantageously minimize the possibility of arcing upon application of an electrical potential therebetween.

As best appreciated from FIG. 2, the corona producing portion 11 in the illustrated embodiment comprises a longitudinal grooved portion of the electrode 10. However, it is understood that the present invention is not limited to such a configuration. Thus, for example, the corona producing portion 11 may include a helically grooved portion of rod shaped electrode 10, or a portion thereof alternatively configured to enable the formation of the corona discharge. Accordingly, as used herein the term "corona producing portion" describes a portion of an electrode suitably configured to produce both an electrostatic field and a radiating flow of particle-charging ions when a suitable voltage gradiant is provided between the corona production portion 11 and the outer wall 3 of the cyclonic separation zone 2.

The corona discharge producing means as defined herein also includes electrical means for providing a corona producing voltage gradient between the corona producing portion 11 and the separation zone outer wall surface 3. As illustrated, this electrical means includes a high voltage source 15 electrically connected to the corona producing portion 11; suitable grounding means 16 for the outer wall 3; and conventional electrical insulation 17 insufficient to enable the generation of a high voltage gradient between corona producing portion 11 and grounded wall portion 3. The polarity of the high voltage source 15 may either be positive or negative. Similarly, if desired for a given situation, the high voltage source 15 may alternatively be electrically connected to the outer wall 3, and the corona producing portion suitably grounded without departing from the present invention.

The embodiment depicted in FIG. 3 includes a corona producing portion 11 with a configuration different from that of FIG. 1 in that the portion 11 comprises at least a portion of the exhaust duct 6. More specifically, the corona producing portion 11 includes an exterior portion of the exhaust duct 6 extending into the cyclonic separation zone 2. As detailed in FIG. 5, the illustrated corona producing portion 11 includes two rings of pointed projections 18 and 19 extending out from the exterior surface of the exhaust duct 6. The projections depicted in FIGS. 3 and 5 are enlarged for illustrative purposes, and would typically be of a smaller dimension relative to the exhaust duct 6. Of course, the present invention is not limited to the illustrated configuration of the corona producing portion 11, and may include other configurations such as noted hereinabove.

Similarly, the electrical connection depicted in the embodiment of FIG. 3 may also be varied. As perhaps best appreciated from FIG. 4, the voltage source 5 is directly connected to an electrically conducting exhaust duct 6 as at 21. In this manner the corona producing portion 11 of FIG. 3 is electrically connected to the source 15 through the duct 6. Alternatively, the portion 11 could be insulated from the duct 6 and be directly connected to the voltage source 15 without departing from the present invention.

In the operation of a reverse flow cyclone separator according to the present invention, a particulate-laden raw gas is introduced through the inlet 1 and is imparted with a swirl as indicated by the arrows 20 prior to the introduction of the raw gas into the separation zone 2. The swirl imparted to the gas tends to centrifugally concentrate the particulates adjacent the outer wall 3 of the separtion zone 2. The swirling gas flows downwardly through the separation zone 2, thereby effecting the removal of separated particulate matter from the outer wall 3 into the particulate collection hopper 5. The direction of the swirling gaseous flow is reversed in the lower portion of the separation zone 2 adjacent to the base plug 4, and is withdrawn from the separator through the exhaust duct 6.

In the operation of the air shield cyclone separator depicted in FIG. 1 a stream of relatively clean shield gas enters the separation zone 2 through the inwardly disposed introduction zone 9 after being imparted with a co-swirling motion in the inlet 7. As more fully described in the cited Giles patent, this co-swirling flow effectively shields the exhaust duct inlet 12 from a possible short-circuiting flow of raw gas from the inlet 1, thereby improving separator performance.

It has been observed that in reverse flow cyclone separation systems in which the separtion zone 2 is provided with an electrostatic field and the raw gas introduced through the inlet 1 contains precharged particulate matter, the separation efficiency has been less than that theoretically obtainable. This decreased efficiency is presumed to result from the loss of particle charge due to wall effects in the reverse flow cyclone.

In the operation of the present invention, the raw gas introduced through the swirl-inducing inlet 1 may include uncharged particulate matter. The centrifugal separation of particulates typical of cyclone separators is enhanced in the operation of the present invention by providing a voltage differential between the corona producing portion 11 and the outer wall surface 3 of the separation zone 2 whereby a radiating flow of particle-charging ions is produced. Particulate matter flowing through this flow of ions is charged thereby. The resultant charge on the particles and the radial electrostatic field between the corona producing portion 11 and the wall 3 serve to displace the particulate matter from the gaseous flow and enhance the outward migration tendencies of the particulates towards the wall 3 under the influence of the centrifugal forces in the separation zone 2. This enhanced migration is especially noteworthy as regards smaller particulates which are typically less affected by centrifugal separation as noted hereinabove. In this manner, overall separation efficiency is improved. Moreover, the loss of particle charge due to wall effects is avoided in the present invention by the continuous presence of the flow of particle-charging ions from the corona producing portion 11. Of course, it is understood that precharging of particles in a raw gas stream prior to the introduction of the stream into the inlet 1 can enhance the separation performance of the present invention.

The reverse flow cyclone separator depicted in FIG. 1 is advantageously provided with an additional electrical means 25 to effect the formation of a suitable secondary voltage gradient (as described hereinbelow) between the inlet structure 8 defining the shield gas introduction zone 9 and the outer wall 3 of separation zone 2. This electrical means of course includes suitable conventional electrical insulation 30 and 31 between the structure 8 and the wall 3. This secondary voltage gradient is selected to be compatible with the primary voltage gradient between the corona producing portion 11 and the outer wall 3 so as to prevent interference by the structure 8 with the corona discharge and electrostatic field associated with the primary voltage gradient. Accordingly, the additional electrical means is preferably selected to provide a secondary voltage gradient substantially equal to the primary voltage gradient as measured at the structure 8. Thus, the structure 8 would be substantially electrically invisible to charged particles during their electrostatically induced migration towards the wall 3.

The above described embodiments of this invention are intended to be exemplitive only and not limiting and it will be appreciated from the foregoing by those skilled in the art that many substitutions, alterations and changes may be made to the disclosed structures and processes without departing from the spirit or the scope of the invention.

What is claimed as new and desired to be secured by Letters Patent of the United States is:

1. A reverse flow cyclone separator comprising a first swirl-inducing raw gas inlet, a radially inwardly disposed exhaust duct, a cyclonic separation zone disposed in flow communication intermediate said raw gas inlet and said exhaust duct and a means for producing a corona discharge in said cyclonic separtion zone wherein said corona discharge producing means comprises an electrode disposed substantially coaxially in said exhaust duct and having a corona producing portion extending out of said duct inlet into said cyclonic separation zone and first electrical means to enable the formation of a corona discharge between said corona producing portion and a wall of said cyclonic separation zone and further comprising a second swirl inducing inlet for substantially contaminant free gaseous medium, said second inlet including an inlet structure defining an introduction zone disposed radially inwardly from said raw gas inlet and radially outwardly of the inlet of said exhaust duct and second electrical means for forming a voltage gradient between said inlet structure and said wall of said cyclonic separation zone.

2. A reverse flow cyclone separator as in claim 1 wherein said electrode comprises a rod and said corona producing portion is a longitudinally grooved portion of said rod.

3. A reverse flow cyclone separator as in claim 2 wherein said corona producing portion is a substantially helically grooved portion of said rod.

4. A reverse flow cyclone separator as in claim 1 wherein said second electrical means is adapted to provide said voltage gradient such that said voltage gradient is equal to the voltage gradient produced by said corona discharge means.

* * * * *